United States Patent
Voss et al.

(10) Patent No.: US 7,748,408 B2
(45) Date of Patent: Jul. 6, 2010

(54) CLOSING DEVICE

(75) Inventors: Christoph Voss, Frankfurt am Main (DE); Christian Courth, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 408 days.

(21) Appl. No.: 11/883,493

(22) PCT Filed: Jan. 6, 2006

(86) PCT No.: PCT/EP2006/050066

§ 371 (c)(1),
(2), (4) Date: Aug. 1, 2007

(87) PCT Pub. No.: WO2006/082120

PCT Pub. Date: Aug. 10, 2006

(65) Prior Publication Data

US 2008/0148686 A1 Jun. 26, 2008

(30) Foreign Application Priority Data

Feb. 2, 2005 (DE) .................. 10 2005 004 679
Jul. 27, 2005 (DE) .................. 10 2005 034 985

(51) Int. Cl.
*F15B 13/044* (2006.01)

(52) U.S. Cl. .................. 137/625.69; 137/625.27; 137/625.65

(58) Field of Classification Search ............. 137/625.27, 137/625.65, 625.69
See application file for complete search history.

(56) References Cited

U.S. PATENT DOCUMENTS

| 3,016,920 | A | * | 1/1962 | Thomsen et al. | ....... 137/625.65 |
| 3,081,794 | A | * | 3/1963 | Lucien | ................... 137/625.69 |
| 3,580,287 | A | * | 5/1971 | McLaughlin | ........... 137/625.69 |
| 4,128,110 | A | * | 12/1978 | Haytayan | ................ 137/625.27 |
| 5,275,207 | A | * | 1/1994 | Tonhauser et al. | ..... 137/625.65 |
| 5,975,654 | A | | 11/1999 | Zaviska et al. | |
| 6,315,268 | B1 | * | 11/2001 | Cornea et al. | .......... 137/625.65 |
| 6,681,806 | B2 | * | 1/2004 | Isobe | ..................... 137/625.65 |
| 7,069,951 | B2 | * | 7/2006 | Cornea | .................. 137/625.69 |

FOREIGN PATENT DOCUMENTS

| DE | 196 43 289 A1 | 4/1998 |
| DE | 100 46 046 A1 | 8/2001 |
| DE | 100 10 734 A1 | 9/2001 |
| DE | 101 41 135 A1 | 9/2002 |
| DE | 102 42 407 A1 | 3/2004 |
| DE | 10 2004 024 301 A1 | 7/2005 |
| WO | WO 2004/053243 A1 | 6/2004 |

* cited by examiner

*Primary Examiner*—John Rivell
(74) *Attorney, Agent, or Firm*—RatnerPrestia

(57) ABSTRACT

A closing device for closing channels in which pressure fluid is conveyed in a housing. The closing device includes a sealing body that is designed as a sleeve member, the peripheral surface of which is arranged between the accommodating bore and the closing member for sealing purposes, and is subjected to a defined surface pressure in sections.

11 Claims, 1 Drawing Sheet

CLOSING DEVICE

This application is the U.S. national phase application of PCT International Application No. PCT/EP2006/050066, filed Jan. 6, 2006, which claims priority to German Patent Application No. DE102005004679.7, filed Feb. 2, 2005 and German Patent Application No. DE102005034985.4, filed Jul. 27, 2005, the contents of such applications being incorporated by reference herein.

BACKGROUND OF THE INVENTION

1. Field of the Invention

The present invention relates to a closing device for closing channels in a housing in which pressure fluid is conveyed according to the preamble of patent claim 1.

2. Description of the Related Art

DE 196 43 289 A1 discloses a closing device of this type, for example. The closing device consists of a cartridge-like closing member, which is mounted into an accommodating bore of a housing in a pressure-fluid tight relationship thereto, with several elastic sealing rings being arranged in circumferential grooves of the closing member for sealing the closing member in the accommodating bore provided for the closing member. The disclosed sealing concept is considered as disadvantageous in view of the many steps of machining and assembling needed.

SUMMARY OF THE INVENTION

In view of the above, an object of the invention is to provide a closing device of the type initially referred to, which is characterized by a simplified, less expensive and safe manufacture, and special importance is attached to an assembly that offers a mix-up prevention and is free from damage, while allowing generous tolerances in terms of manufacture and assembly.

According to the invention, this object is achieved in a closing device of the type described herein.

Further features, advantages, and details of the invention can be seen in the illustration and subsequent description of a preferred embodiment of the closing device of the invention.

DETAILED DESCRIPTION

Figure 1:
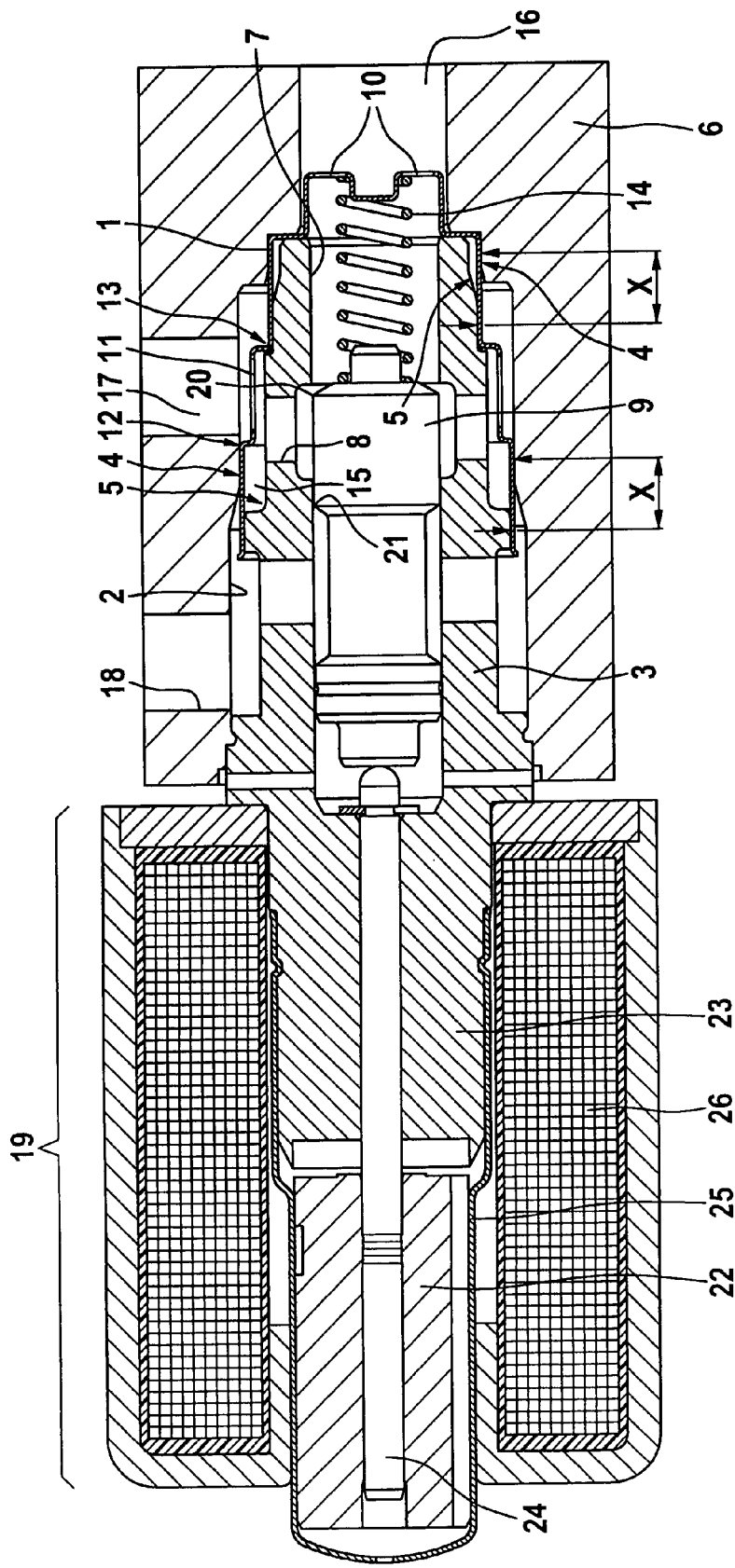
FIG. 1 is a longitudinal cross-sectional view of the closing device according to a first embodiment of the invention.

FIG. 1 shows a longitudinal cross-sectional view of the closing device of the invention for closing pressure-fluid-conveying channels 16, 17, 18 in a housing 6, into which a cartridge-type closing member 3 is mounted in a pressure-fluid tight fashion. To seal the closing member 3 in an accommodating bore 2 of the housing 5 that is provided for the closing member 3, a sealing body is arranged between the closing member 3 and the accommodating bore 2, which is configured as a sleeve member 1 according to the invention, whose peripheral surface is arranged between the accommodating bore 2 and the closing member 3, and is subjected to a defined tolerance-compensating surface pressure in sections.

In the joining direction of the closing member 3, both the accommodating bore 2 and the closing member 3 are respectively provided with a pair of stepped portions 4, 5 decreasing in diameter. Provided between the stepped portions 5 of the closing member 3 and the stepped portions 4 of the accommodating bore 2 is an annular chamber 15 in which the sleeve member 1 extends to bridge an axial distance X existing between the stepped portions 4, 5. Within the annular chamber 15, the sleeve member 1 abuts favorably with its peripheral surface, on either side of the transverse bore 11, alternatingly on the accommodating bore 2 and on the closing member 1 under radial bias in a pressure-fluid-tight manner. The alternating abutment surfaces of the sleeve member 1, which are generously dimensioned, at the closing member 3 and at the accommodating bore 2 have an axial distance X, which permits in each case bridging a rough-tolerance axial and radial offset between the pairs of stepped portions 4, 5 at the closing member 3 and the accommodating bore 2.

Due to the axial distance X between the alternating abutment surfaces of the sleeve member 1 and due to the radial biasing force of the sleeve member 1, which is made of elastic material, preferably metal or plastics, it is thus ensured that both axial and radial distances between the stepped portions 4, 5 can be bridged by the sleeve member 1 in a fluid-tight manner so that short-circuit or leakage currents between the closing member 3 and the accommodating bore 2 are prevented in a simple manner.

Therefore, the radial elasticity and the abutment surfaces of the sleeve member 1 and the axial and radial distances between the stepped portions 4, 5 have to be dimensioned only in such a rough way that, irrespective of tolerances of manufacture and expansion, the desired sealing effect of the sleeve member 1 relative to the channels 16, 17, 18 that open into the accommodating bore 2 is safeguarded.

Due to the preferred use of metal, the sleeve member 1 is favorably configured as a sleeve bowl, which is manufactured in a deepdrawing process at low cost, precisely and in small size, and the deepdrawn stepped contour of the sleeve bowl contributes to a precise alternating abutment of the sleeve member 1 on the accommodating bore and on the closing member 3.

In terms of manufacture, the sleeve member 1 can be arranged in an especially simple manner in its capacity as a part being pre-assembled at the closing member 3 or in the accommodating bore 2, for what purpose the sleeve member 1 is supported in the end area of the sleeve bowl with a step either at the end surface of the closing member 3 or at a bore step provided in the end area of the accommodating bore 2.

To convey pressure fluid, the closing member 3 includes longitudinal and transverse bores 7, 8, and a valve closure member 9 inserted into the longitudinal bore 7 of the closing member 3 ensures a switchable hydraulic connection between the longitudinal and transverse bores 7, 8, with the result of pressure fluid exchange between the channels 16, 17, 18 that is in conformity with requirements.

Since the sleeve member 1 extends between the stepped portions 5 at the closing member 3 and the stepped portions 4 of the accommodating bore 2 in the annular chamber 15, likewise the sleeve member 1 includes at least one longitudinal and transverse bore 10, 11 to convey pressure fluid, the bores overlapping at least in sections the longitudinal and transverse bores 7, 8 of the closing member 3. According to the illustration, the transverse bore 11 penetrates the peripheral surface of the sleeve member 1 between two stepped portions 12, 13 at the sleeve member 1, while the longitudinal bore 10 is favorably split up into two through-bores that open eccentrically into the bowl bottom of the sleeve member 1.

In the present embodiment, the valve closure member 9 includes an electromagnetically operable slide valve, which is acted upon by a spring 14 on the end surface remote from the magnet drive 19, said spring being supported between the two through-bores on the bowl bottom of the sleeve member 1.

The effect of the spring 14 causes the valve closure member 9 to adopt a position in the electromagnetically non-excited state in which a hydraulic connection exists between the channel 16, which is provided as a tank connection in the housing 6, and the channel 17 provided as a working connection in the housing 6. To this end, the valve closure member 9 has lifted with its control edge 21 from a control edge in the closing member 3, so that a connection is established between the channels 16, 17 by way of the longitudinal bores 10 in the sleeve bowl, the longitudinal and transverse bore 7, 8 in the closing member 3 and the transverse bore 11 in the sleeve member 1.

When the valve closure member 9 is electromagnetically energized, the connection between the channels 16, 17 is either partly or completely interrupted, depending on the degree of overlapping of the control edges mentioned before. The channel 18 that is provided for the pressure connection will only be in communication with the channel 17 provided as working connection when another control edge 22 at the valve closure member 9 opens the transverse bore 8 in the closing member 3. The magnetic drive 19 provides a proportional control of the valve closure member 9 so that the valve closure member 9 can be moved to assume any position desired. The magnet drive 19 is positioned at the part of the closure member 9 that projects from the housing 6 and is preferably attached by means of self-tapping wedging in the external end area of the accommodating bore 2. In addition, the wedging used is advantageous because a seal-tight operative and positive connection in the direction of the atmosphere is achieved for the closing member at the external end area.

The part of the closing member 3 that projects from the accommodating bore 2 assumes the function of a magnet core 23 that faces an armature 22, through which magnet core a valve tappet 24 extends towards the valve closure member 9. The armature 22 extends through a valve sleeve 25, which is attached at the magnet core 23. A magnet coil 26 encloses the outside periphery of the valve sleeve 25.

The invention is not limited to the described use of the closing device for the accommodation of valve components. In its most general form, it is based on a closing member 3 in the shape of a cartridge-like closing plug, which is inserted into an accommodating bore 2 furnished with at least one pair of channels. To avoid undesirable flow connections between the channels, the disclosed sleeve member 1 enables a simple and yet reliable sealing of the closing member 3 in the accommodating bore 2.

Thus, the integration of a valve in the closing member 3 as shown in FIG. 1 represents only a particularly suitable embodiment of the invention.

The invention claimed is:

1. Closing device for closing channels in which pressure fluid is conveyed in a housing, into which a cartridge-type closing member is mounted in a pressure-fluid-tight manner, wherein for sealing the closing member in an accommodating bore of the housing that is provided for the closing member, at least one sealing body is arranged between the closing member and the accommodating bore, wherein the sealing body is configured as a sleeve member, whose peripheral surface is arranged between the accommodating bore and the closing member for sealing purposes, and is subjected to a defined surface pressure in sections, wherein the accommodating bore and the closing member are respectively provided with at least one stepped portion decreasing in diameter in a joining direction of the closing member, with an annular chamber being provided between the stepped portion of the closing member and the stepped portion of the accommodating bore, in which chamber the sleeve member extends in a pressure-fluid-tight manner to bridge an axial distance (X) that exists between the two stepped portions.

2. Closing device as claimed in claim 1, wherein the sleeve member is made of elastic material.

3. Closing device as claimed in claim 1, wherein the closing member is equipped with longitudinal and transverse bores for the selective passage of pressure fluid.

4. Closing device as claimed in claim 3, wherein an electromagnetically operable valve closure member is inserted into the longitudinal bore of the closing member, which establishes a switchable hydraulic connection between the longitudinal and transverse bores.

5. Closing device as claimed in claim 3, wherein for conveying pressure fluid, the sleeve member includes at least one longitudinal and transverse bore, which overlap at least in sections the longitudinal and transverse bores of the closing member.

6. Closing device as claimed in claim 1, wherein the sleeve member is made of metal or plastics.

7. Closing device for closing channels in which pressure fluid is conveyed in a housing, into which a cartridge-type closing member is mounted in a pressure-fluid-tight manner, wherein for sealing the closing member in an accommodating bore of the housing that is provided for the closing member, at least one sealing body is arranged between the closing member and the accommodating bore, wherein the sealing body is configured as a sleeve member, whose peripheral surface is arranged between the accommodating bore and the closing member for sealing purposes, and is subjected to a defined surface pressure in sections, wherein within an annular chamber, the peripheral surface of the sleeve member abuts alternatingly at the accommodating bore and the closing member under radial bias in a pressure-fluid-tight manner, and alternating abutment surfaces of the sleeve member at the closing member and at the accommodating bore are arranged at a distance, which corresponds to an axial distance (X) between at least one stepped portion provided at the closing member and the accommodating bore.

8. Closing device for closing channels in which pressure fluid is conveyed in a housing, into which a cartridge-type closing member is mounted in a pressure-fluid-tight manner, wherein for sealing the closing member in an accommodating bore of the housing that is provided for the closing member, at least one sealing body is arranged between the closing member and the accommodating bore, wherein the sealing body is configured as a sleeve member, whose peripheral surface is arranged between the accommodating bore and the closing member for sealing purposes, and is subjected to a defined surface pressure in sections, wherein an axial and radial distance between stepped portions of the accommodating bore and the closing member and an elasticity of the sleeve member are dimensioned in such a way that a pressure-fluid-tight closure of the housing is ensured by the sleeve member irrespective of tolerances of manufacture and expansion of the closing member and the accommodating bore.

9. Closing device for closing channels in which pressure fluid is conveyed in a housing, into which a cartridge-type closing member is mounted in a pressure-fluid-tight manner, wherein for sealing the closing member in an accommodating bore of the housing that is provided for the closing member, at least one sealing body is arranged between the closing member and the accommodating bore, wherein the sealing body is configured as a sleeve member, whose peripheral surface is arranged between the accommodating bore and the closing member for sealing purposes, and is subjected to a defined surface pressure in sections, wherein the sleeve member is configured as a sleeve bowl, which is manufactured in a deepdrawing process, and a bowl bottom can be seated on a step of the closing member, a step of the accommodating bore or both.

10. Closing device for closing channels in which pressure fluid is conveyed in a housing, into which a cartridge-type closing member is mounted in a pressure-fluid-tight manner, wherein for sealing the closing member in an accommodating bore of the housing that is provided for the closing member, at least one sealing body is arranged between the closing member and the accommodating bore, wherein the sealing body is configured as a sleeve member, whose peripheral surface is arranged between the accommodating bore and the closing member for sealing purposes, and is subjected to a defined surface pressure in sections, wherein the closing member is equipped with longitudinal and transverse bores for selective passage of pressure fluid, wherein for conveying pressure fluid, the sleeve member includes at least one longitudinal and transverse bore, which at least partially overlap the longitudinal and transverse bores of the closing member, wherein the transverse bore of the sleeve member penetrates a peripheral surface of the sleeve member.

11. Closing device for closing channels in which pressure fluid is conveyed in a housing, into which a cartridge-type closing member is mounted in a pressure-fluid-tight manner, wherein for sealing the closing member in an accommodating bore of the housing that is provided for the closing member, at least one sealing body is arranged between the closing member and the accommodating bore, wherein the sealing body is configured as a sleeve member, whose peripheral surface is arranged between the accommodating bore and the closing member for sealing purposes, and is subjected to a defined surface pressure in sections, wherein the closing member is equipped with longitudinal and transverse bores for the selective passage of pressure fluid, wherein an electromagnetically operable valve closure member is inserted into the longitudinal bore of the closing member, which establishes a switchable hydraulic connection between the longitudinal and transverse bores, wherein the valve closure member is configured as a slide and/or seat valve, which is acted upon by a spring that is supported on the sleeve member.

* * * * *